Figure 1:
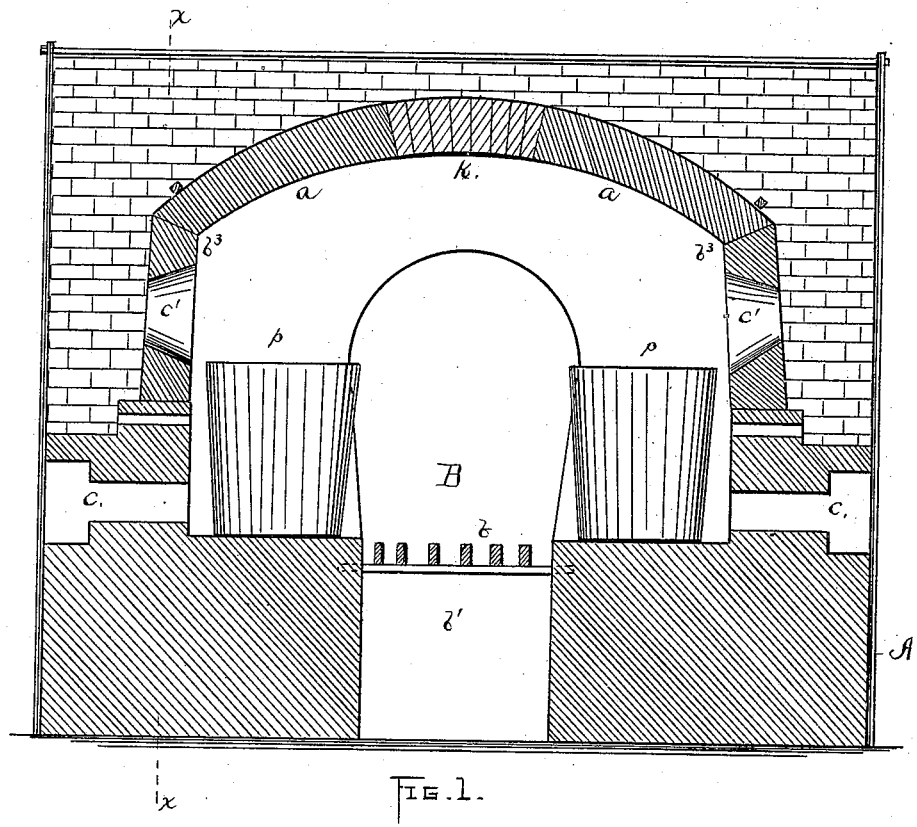

(No Model.)  2 Sheets—Sheet 1.

H. FELKER.
GLASS FURNACE STONE.

No. 330,473.  Patented Nov. 17, 1885.

WITNESSES:
Pierrepont Bartow
George C. Carter

INVENTOR
Henry Felker
BY Risly, Lewis & Perry,
his ATTORNEYS (No Model.) 2 Sheets—Sheet 2.

H. FELKER.
GLASS FURNACE STONE.

No. 330,473. Patented Nov. 17, 1885.

WITNESSES:
Pierrepont Bartow
George C. Carter

INVENTOR
Henry Felker
BY Risley, Lewis & Perry
his ATTORNEYS

UNITED STATES PATENT OFFICE.

HENRY FELKER, OF VERONA, ASSIGNOR TO MUNROE & CO., OF DUNBARTON, NEW YORK.

GLASS-FURNACE STONE.

SPECIFICATION forming part of Letters Patent No. 330,473, dated November 17, 1885.

Application filed July 8, 1885. Serial No. 170,934. (No model.)

*To all whom it may concern:*

Be it known that I, HENRY FELKER, of the town of Verona, in the county of Oneida and State of New York, have invented certain new and useful Improvements in Glass-Furnace Stones; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to the form and construction of cap-stones for constructing and forming the top of arch of a glass-furnace; and it consists in the construction and arrangement of the stone in the furnace, as hereinafter pointed out and claimed.

Heretofore, so far as I am aware, the arch or upper portion of glass-furnaces have been formed or constructed by building wood arches, which have been covered with German or American clay to the required depth, put on to the wood arch in a plastic state, some preferring the plastic arch solid, others marking or cutting the upper surface, while in a plastic state, in blocks to direct the cracks when the fire is applied to the furnace. When the arch thus formed was sufficiently dried, the timber or lumber on which the same was built was removed and the fire applied to the furnace. The shrinkages in the arch or roof of the furnace produced cracks running in all directions, frequently producing openings through which the air passed into the furnace or cracks in the inner surface of the arch, which becomes plastic under intense heat, frequently causing the surface of the arch to become fluxed with the molten clay, which follows the circular surfaces of the arch until a sufficient accumulation takes place at the various cracks, when the same is dropped into the pots containing the molten glass, thereby producing discoloration and lumps, seriously impairing the quality of glass. To overcome this difficulty, I provide a stone constructed of American or German clay, or other suitable material, of sufficient length to span the upper surface of the arch covering the pot. These stones may be of any desired width, so long as the seams run crosswise of the furnace, so that the flux produced by the heat in the furnace will follow the seam or seams in the arch to the lower end of each stone or seam, thereby preventing the flux from dropping into the molten glass in the pots.

In the accompanying drawings similar letters of reference refer to corresponding parts throughout the several views.

Figure 3:
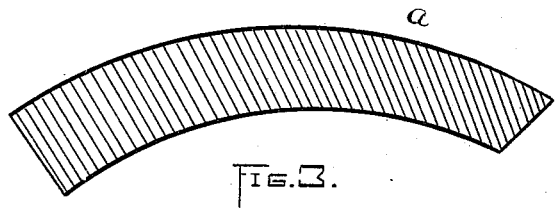
Figure 4:
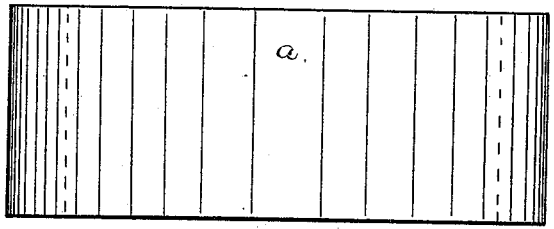
Figure 2:
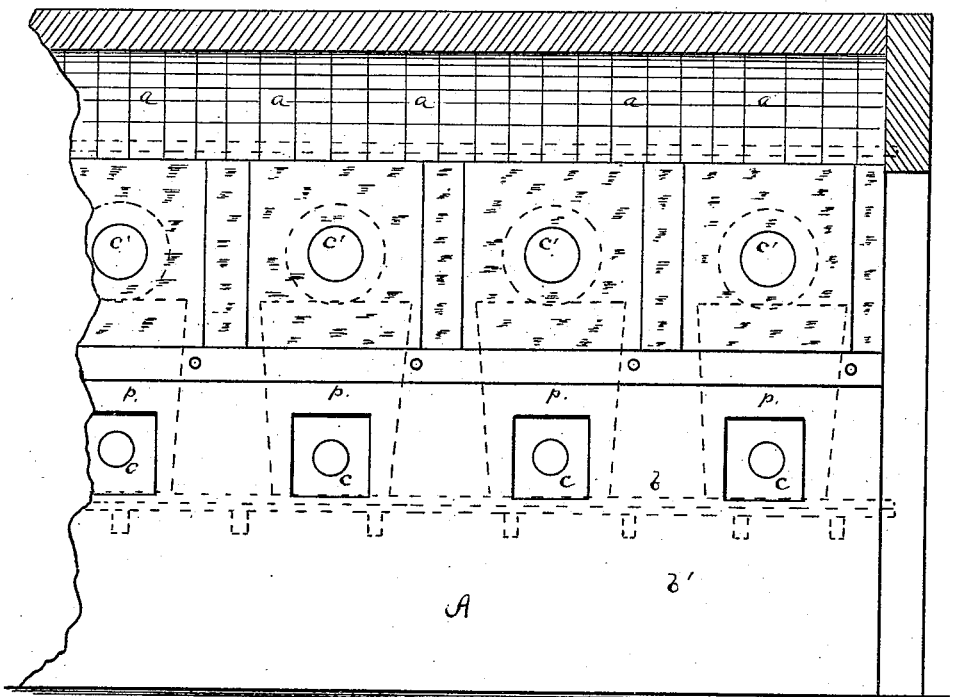

In the drawings, Figure 1 represents a front elevation of an ordinary glass-furnace with my improved stones forming the arch of the same. Fig. 2 represents a portion of the side of an ordinary furnace, taken at line $x\ x$ at Fig. 1. Fig. 3 represents an edge view of my improved stone. Fig. 4 represents a side or top view of the same.

In constructing my improved stone, I provide a suitable mold, made of wood or other suitable material. I then mix either German or American clay to the required consistency to be easily molded or formed, and place the same in the molds, where it is left a sufficient length of time to sufficiently dry, when the same is removed and the stone cut or dressed to the required size and dimensions.

$a$ represents my improved stone of the ordinary construction.

A represents the walls of a glass-furnace. B, represents the fire-box; $b$, the grate, and $b'$ the ash-pit.

$c$ represents cloot-holes through the walls of the furnace, for removing or repairing the glass-pot.

$c'$ represents the ring-hole through the walls of the furnace, for removing the glass from the pots.

$p$ represents the glass-pots.

All of the foregoing are of the ordinary construction.

On the upper surfaces of the inner side walls, $b^3\ b^3$, I provide a shoulder, on which one end of the circular stone $a$ rests, as shown in Fig. 1. These stones are held in the arch over the glass-pots by one or more key-stones or bricks. $k$ represents the keys or bricks, for keeping the arch in position. These stones are placed in the arch side by side, and may be formed of any width. I prefer them to be about twenty-two inches in width, so that the seams may come substantially in the center of the pot; but this may be varied according to the wishes of the person using the same. These stones must be of sufficient length to span the entire surface of the glass-pot, so that the flux produced by the heat will follow the inner surface of the stone, as well as the seam, thereby wholly preventing the flux from dropping into the glass-pot.

What I claim as new, and desire to secure by Letters Patent, is—

The combination, in a glass-furnace, with the walls thereof, of an arch constructed of stones, which spans the glass-pots, substantially as described, for the purposes stated.

In witness whereof I have affixed my signature in presence of two witnesses.

HENRY FELKER.

Witnesses:
EDWIN H. RISLEY,
L. STUART.